US008874409B2

(12) United States Patent
Dhurandhar et al.

(10) Patent No.: US 8,874,409 B2
(45) Date of Patent: Oct. 28, 2014

(54) MULTI-STEP TIME SERIES PREDICTION IN COMPLEX INSTRUMENTED DOMAINS

(75) Inventors: Amit Dhurandhar, Yorktown Heights, NY (US); Jayant R. Kalagnanam, Tarrytown, NY (US)

(73) Assignee: International Business Machines Corporation, Armonk, NY (US)

( * ) Notice: Subject to any disclaimer, the term of this patent is extended or adjusted under 35 U.S.C. 154(b) by 791 days.

(21) Appl. No.: 12/966,465

(22) Filed: Dec. 13, 2010

(65) Prior Publication Data

US 2012/0150489 A1 Jun. 14, 2012

(51) Int. Cl.
G06F 17/18 (2006.01)
(52) U.S. Cl.
CPC .............. *G06F 17/18* (2013.01); *G06F 10/04* (2013.01)
USPC ............................ 702/179; 702/182; 702/189
(58) Field of Classification Search
USPC ............. 715/772; 702/179, 182, 189; 700/96, 700/97, 108, 110
See application file for complete search history.

(56) References Cited

U.S. PATENT DOCUMENTS

| 5,735,546 A * | 4/1998 | Kurtzberg et al. ............... 283/67 |
| 6,853,920 B2 * | 2/2005 | Hsiung et al. .................... 702/1 |
| 2006/0224356 A1 * | 10/2006 | Castelli et al. ................ 702/176 |

OTHER PUBLICATIONS

Hoerl Arthur E., et al., Ridge Regression: Applications to Nonorthogonal Problems, Technometrics, vol. 12, No. 1, Feb. 1970, pp. 69-82.
Kotsiantis S.B., Supervised Machine Learning: A Review of Classification Techniques, Informatica, Oct. 1, 2007, pp. 249-268.
Liu et al., "Learning Dynamic Temporal Graphs for Oil-production Equipment Monitoring System", KDD'09, Jun. 29-Jul. 1, 2009, Paris, France.
Arnold et al., "Temporal Causal Modeling with Graphical Granger Methods", KDD'07, Aug. 12-15, 2007, San Jose, California, USA.
Heckerman, "A Tutorial on Learning With Bayesian Networks", Technical Report, Mar. 1995, MSR-TR-95-06, Microsoft Research, Redmond, WA, pp. 1-57.
Diebold et al., "Regime switching with time-varying transition probabilities", Oxford University Press, book entitled "Nonstationary Time Series Analysis and Cointegration.", Oct. 1994, pp. 283-302.
Friedman et al., "Learning Bayesian Network Structure form Massive Datasets: The "Sparse Candidate" Algorithm", Proceedings of the Fifteenth Conference on Uncertainty in Artificial Intelligence) Jul. 30-1, 1999, Stockholm, Sweden, pp. 206-215.

* cited by examiner

*Primary Examiner* — Elias Desta
(74) *Attorney, Agent, or Firm* — Scully, Scott, Murphy & Presser, P.C.; Daniel P. Morris, Esq.

(57) ABSTRACT

A system, method and computer program product for improving a manufacturing or production environment. The system receives two or more time series data having values that represent current conditions of the manufacturing or production environment as inputs. The system determines one or more different regimes in the received two or more time series data. The system predicts future or unmeasured values of the received two or more time series data in the determined different regimes. The future or unmeasured values represent future conditions of the manufacturing or production environment.

20 Claims, 10 Drawing Sheets

Algorithm 1 Regression algorithm where we identify different states and learn a regression function for each state (Training phase).

---

Input: $d$ time series $T_1, T_2, ..., T_d$ of length $N$, where $T_d$ is the target time series, minimum cluster size $\delta$ andCMSE error threshold $\epsilon$.

Output: Regression functions predicting the target and pairwise least square coefficients for every pair of input time series corresponding to each state/regime.

Initialize currentSize = $N$, currentChildren = 1, Array States = [], h = 1 {h denotes depth of the tree} while currentSize $\geq \delta$ do
   {Compute CMSE for each node in the tree.}
   for $i$ = 1 to currentChildren do
     Perform a least squares fit between $T_1^{(i)}$ and $T_k^{(i)}$
     $\forall j \in \{1,...,d-2\}, k \in \{j+1,...,d-1\}$ storing the
     corresponding $MSE_{jk}$ {$T_j^{(i)}$ corresponds to values
     in time series $T_j$ restricted to the $i^{th}$ child at depth
     $h$.}
     $CMSE^{(hi)} = \sum_{j-1,k-j+1}^{d-2,d-1} MSE_{jk}$
   end for
   $h = h + 1$
   currentSize = $\left[\frac{currentSize}{2}\right]$
   currentChildren = 2currentChildren
end while
currentChildren = $\frac{currentChildren}{2}$
count = 0
h=h-1
if h==1 then
   {Identifying states.}
   count = count + 1
   States[count] = 11
else
   for $i$ = 1 to currentChildren do
     p = i
     for $j$ = h to 2 do
       if $CMSE^{(j[p/2])} - CMSE^{(jp)} \geq \epsilon$ then
         count = count+1
         States[count] = jp
         break
       else if $j$ == 2 then
         count = count + 1
         States[count] = 11
       end if
       p = [p/2]
     end for
   end for
end if
From the array States note the distinct states and learn regression functions for each state.

FIG. 11

Algorithm 2 Learning scaling factors to increase the dynamic range of predictions (Training phase).

Input: d time series $T_1, T_2, ..., T_d$ of length $N$, where $T_d$ is the target time series, $l$ and $u$. {$l$ and $u$ are limits to determine the 3 classes.}
Output: Scaling factors for 3 classes.
Initialize $S_1 = 0, S_2 = 0, S_3 = 0, c_1 = 0, c_2 = 0, c_3 = 0$ {$S_1, S_2, S_3$ are the scaling factors}
for $i = 1$ to $N$ do
    {Create new time series $T_{d+1}$ of class labels depending on $l$, $u$ and $Td$.} if $t_d^{(1)} \leq l$ then {$T_1 = (t_1^{(1)}, t_1^{(2)}, ..., t_1^{(N)})$.}
    $t_{d+1} = 1$
    else if $t_d^{(1)} \geq u$ then
        $t_{d+1} = 3$
    else
        $t_{d+1} = 2$
    end if
end for
Train the classification algorithm chosen, with $T_1, ..., T_{d-1}$ as input and $T_{d+1}$ as output.
Output a classification function $\zeta(.)$. {$\zeta$ takes a datapoint as input and outputs a class label.}
for $i = 1$ to $N$ do
    if $\zeta(x_i) == 1$ then
        {$x_i = (t_1^{(i)}, ..., t_{d-1}^{(i)})$}
        $S_1 = S_1 + \frac{t_d^{(i)}}{\tau(x_i)}$ {$\tau(.)$ is the regression function built by algorithm 1.}
        $c_1 = c_1 + 1$
    else if $\zeta(x_i) == 2$ then
        $S_2 = S_2 + \frac{t_d^{(i)}}{\tau(x_i)}$
        $c_2 = c_2 + 1$
    else
        $S_3 = S_3 + \frac{t_d^{(i)}}{\tau(x_i)}$
        $c_3 = c_3 + 1$
    end if
end for
if $c_1 \geq 1$ then
    $S_1 = S_1/c_1$
else
    $S_1 = 1$
end if
if $c_2 \geq 1$ then
    $S_2 = S_2/c_2$
else
    $S_2 = 1$
end if
if $c_3 \geq 1$ then
    $S_3 = S_3/c_3$
else
    $S_3 = 1$
end if

MULTI-STEP TIME SERIES PREDICTION IN COMPLEX INSTRUMENTED DOMAINS

BACKGROUND

The present application generally relates to improving a manufacturing or production environment. More particularly, the present application relates to predicting future values and/or current but not measured values, in time series data that represent conditions of the manufacturing or production environment.

Time series data refers to a sequence of data, which is continuously measured at uniform time intervals. Traditional time series forecasting (i.e., forecasting future values of time series) has been used in business intelligence, weather forecasting, stock market prediction, etc. For example, in demand forecasting, the traditional time series forecasting predicts a quantity of an item that will be sold in a following week given increased sales until a current week. In stock market prediction, given stock prices until today, the traditional time series forecasting predicts stock prices for tomorrow. In weather forecasting, the traditional time series forecasting predicts weather for a next day or may be for an entire following week. However, the farther the traditional time series forecasting predicts, the more the traditional time series forecasting is prone to err.

Traditional time series forecasting uses one or more of: Auto-correlation models and Markovian models. In Auto-correlation models, given time series data $x_1, x_2, \ldots, x_t$, these models attempt to predict a next value $x_{t+1}$. Auto-correlation models include, but are not limited to: Moving average model, Exponential smoothing model, Phase space reconstruction method, etc. Moving average model computes an average of past m values and reports this average as an estimate of a current value. Exponential smoothing model exponentially weights down values that are farther away in time and reports a result (e.g., average of the weighted-down values) as an estimate. Another model in Auto-correlation models computes a current value in time series data as a function of a finite past along with some white noises. The Phase space reconstruction method assumes that time series data of interest is a one dimensional projection of a system whose true phase space is higher dimensional. This Phase space reconstruction method attempts to reconstruct an original dimension and predict current values of the time series data by building statistical models in this reconstructed dimension. Other models in Auto-correlation models incorporate exogenous variables as a linear combination.

Markovian models construct a stationary distribution over a predefined or automatically deciphered state space (e.g., time series). If a state space (e.g., a time series) is not defined, Markovian models decipher hidden states (e.g., future values of the time series). There are variants of these Markovian models which learn state transitions (e.g., changes in time series) as a function of exogenous variables or input vector (e.g., time series data input), however the transitions learned are still stationary in time. The auto-correlation models do not provide a way of partitioning the state space (e.g., an input time series) and modeling non-linear dependencies of exogenous variables (e.g., parameters not described in the time series data input), while the Markovian models learn stationary distributions over the state space which may not be applicable in drifting systems when trying to predict multiple steps ahead, e.g., predict future values of the time series data input. A drifting system refers to its representative time series data having variations over time. In other words, a behavior of a drifting system cannot be accurately predicted in traditional time series forecasting.

SUMMARY OF THE INVENTION

The present disclosure describes a system, method and computer program product for improving a manufacturing or production environment.

In one embodiment, there is provided a system for improving a manufacturing or production environment. The system comprises at least one processor and at least one memory device connected to the processor. The system receives two or more time series data having values that represent current conditions of the manufacturing or production environment as inputs. The system determines different regimes in the received two or more time series data. The system predicts future or unmeasured values of the received two or more time series data in the determined different regimes. The future or unmeasured values represent future conditions of the manufacturing or production environment.

In a further embodiment, to determine the different regimes, the system compares the received two or more time series data. The system identifies at least one relationship between the received two or more time series data. Each different relationship identified represents a different regime.

In a further embodiment, each different linear regressor represents each different relationship.

In a further embodiment, the system divides equally the received two or more time series data until the divided time series data is less than a pre-determined minimum size.

In a further embodiment, the system calculates an error upon fitting each different linear regressor to each different regime. The system sums up the calculated error.

In a further embodiment, the system determines datasets among the received two or more time series data according to the summed error. The system runs a supervised learning algorithm on the determined datasets corresponding to the determined different regimes.

In a further embodiment, the manufacturing or production environment includes a semiconductor manufacturing environment or oil production environment.

In a further embodiment, the received two or more time series data represent physical measurements including one or more of: temperature, pressure, gas flow offset, and temperature flow offset.

In a further embodiment, the system runs a classification algorithm on the received two or more time series data to identify scaling factors. The system scales the predicted values by the identified scaling factors, whereby a quality of the predicting improves.

BRIEF DESCRIPTION OF THE DRAWINGS

The accompanying drawings are included to provide a further understanding of the present invention, and are incorporated in and constitute a part of this specification.

FIG. 11 illustrates an exemplary pseudo code corresponding to the flow chart in FIG. 1 in one embodiment.

FIG. 12 illustrates an exemplary pseudo code corresponding to the flow chart in FIG. 2 in one embodiment.

DETAILED DESCRIPTION

Figure 13:
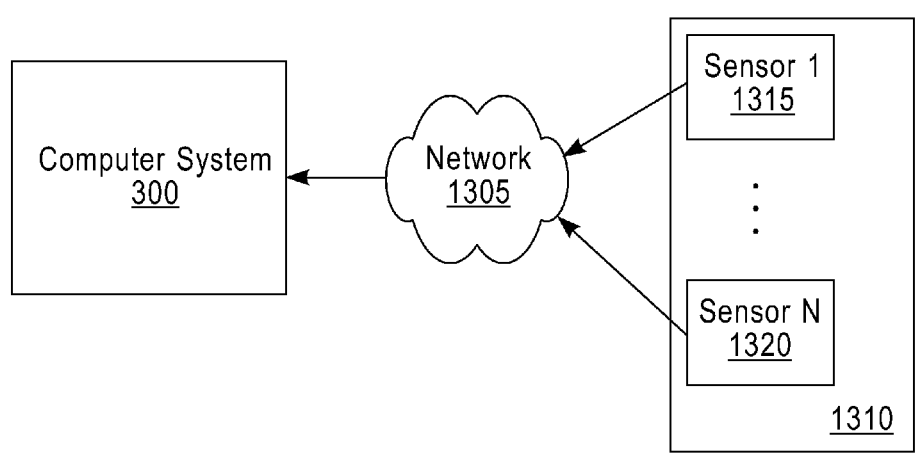
FIG. 13 illustrates an environment where method steps in FIGS. 1-2 are implemented in one embodiment.

FIG. 13 illustrates an environment 1300 where one embodiment of the present invention is employed. Upon receiving, from at least sensor (e.g., a sensor 1315, . . . , a sensor 1320, etc.) installed in a manufacturing or production environment 1310, time series data $T_1, T_2, \ldots, T_d$, a computing system 300 (e.g., a computing system 300 shown in FIG. 3) predicts $T_d$ as far ahead as possible from a time instant t, given other "d−1" input time series data and partial values of $T_d$ until time t.

Figure 1:
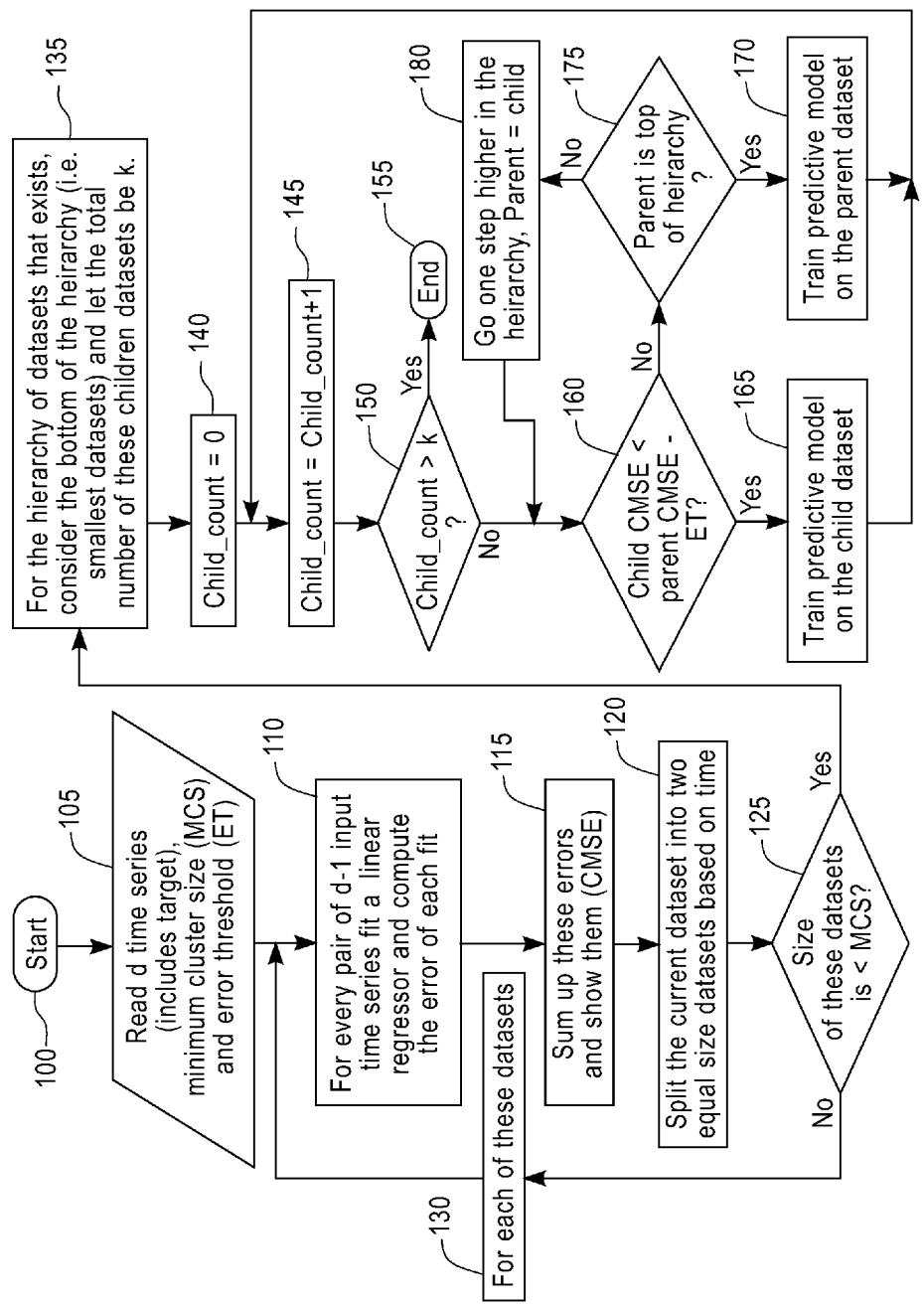
FIG. 1 is flow chart that describes method steps for identifying different regime and for determining dataset to run a supervised learning algorithm in one embodiment.
Figure 2:
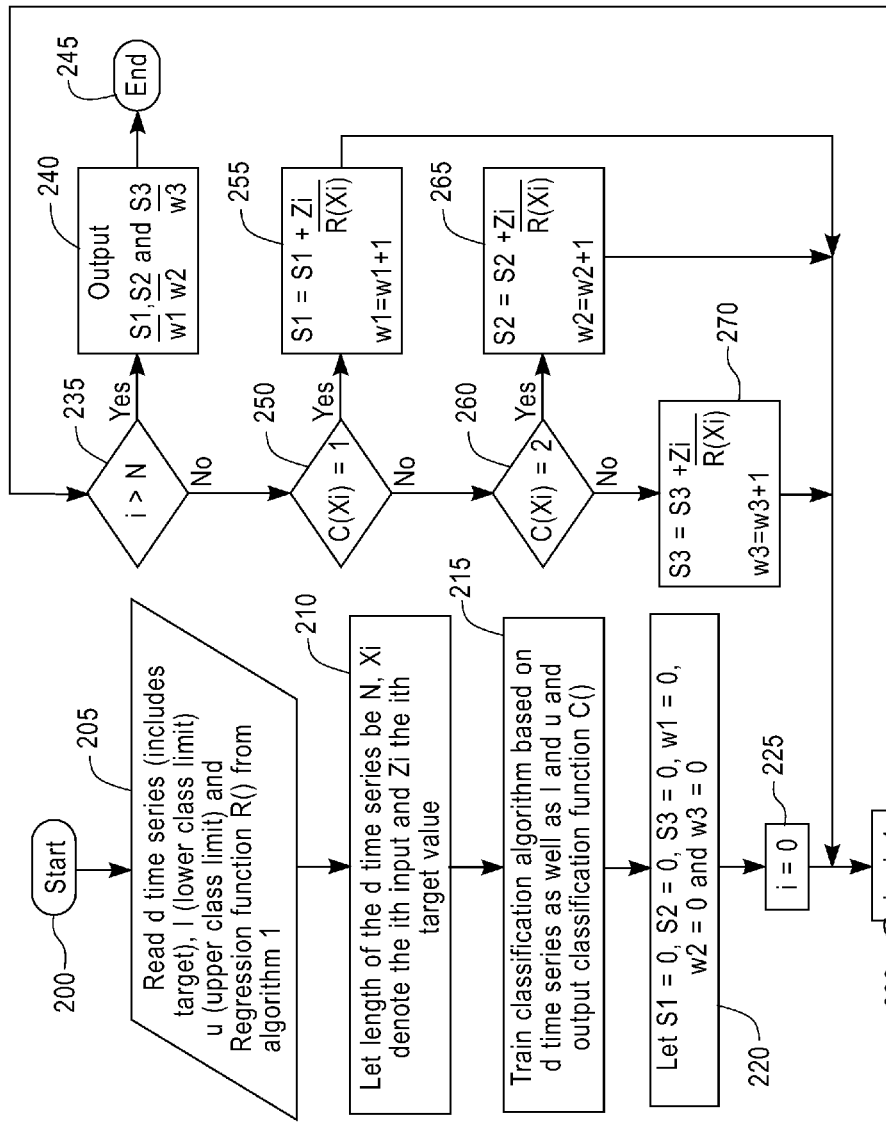
FIG. 2 is a flow chart that describes method steps for determining scaling factors in one embodiment.
Figure 4:
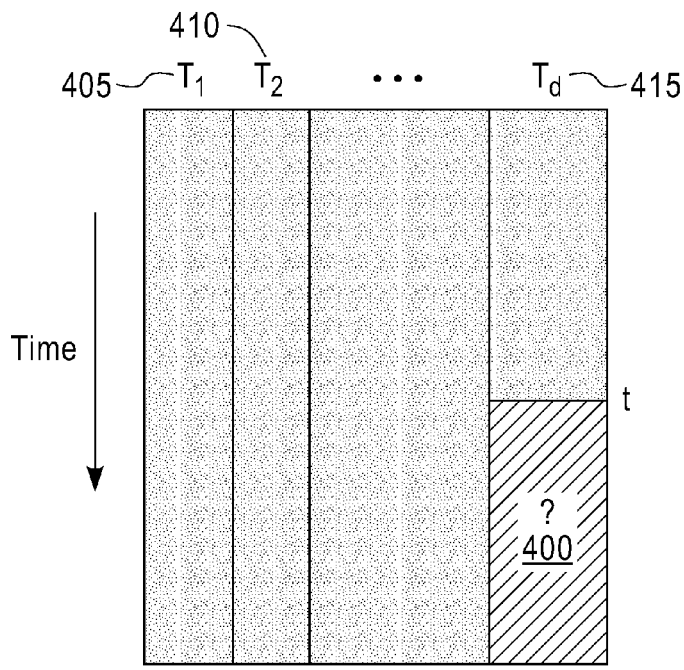
FIG. 4 illustrates an exemplary time series data where a prediction of a future value is made in one embodiment.

FIG. 4 illustrates these received time series data (i.e., input time series) in one embodiment. In FIG. 4, the computing system predicts a region 400 with the question mark ("?"), given time series data $T_1$ 405, $T_2$ 410, . . . , partial $T_d$ 415, e.g., by running method steps described in FIGS. 1-2. FIGS. 1-2 are described in detail below. These time series data are not stationary and relationships between various time series data vary with time. Given a set of time series data from a manufacturing or production environment (e.g., oil production environment or semiconductor manufacturing environment), the computing system continuously or periodically predicts a chosen time series data (e.g., time series data $T_d$ 415 in FIG. 4) for as a distant future time as possible, with knowledge of other time series data (e.g., time series data $T_1$ 405 and $T_2$ 410 in FIG. 4), e.g., by running method steps described in FIGS. 1-2.

In one embodiment, the chosen time series data (e.g., a material deposition rate in a semiconductor process) may be expensive to measure or difficult to obtain compared to other time series data (e.g., temperatures, pressures, gas flow offset, temperature flow offset, etc.). From time series data forecasting perspective, the computing system predicts the chosen time series data as far ahead in time as possible using other time series data that may be measured at prior points in time. For example, in an electronic chip manufacturing industry, measuring a deposition rate of nitrogen dioxide over a wafer is expensive due to special equipment (worth millions of dollars) needed for measuring the deposition rate, however, other parameters, e.g., temperature, pressure etc., can be readily measured without a burdensome overhead. Another example is an oil production industry, where accurately predicting daily reduces cots in comparison with an alternative that involves launching an expensive and dangerous production logging process. In one embodiment, the method steps described in FIGS. 1-2 are methodologies that outperform other state-of-the-art methods for multi-step time series prediction (i.e., predicting future values of a time series) in dynamically changing domains (i.e., time series data dynamically changes in time).

A flow chart in FIG. 1 is a methodology that includes a novel way of identifying distinct regimes in time series data for use in predicting of future or unmeasured values of the time series data. A flow chart in FIG. 2 describes a unique way of increasing a dynamic range of a prediction of time series, e.g., scaling the prediction in accordance with a true dataset.

Upon receiving two or more time series, the computing system models different (hidden) states and learns independent regressors per different states. Different states also called different regimes. Different regimes refer to different relationships between the received time series. The computing system identifies these different regimes, e.g., by comparing these received time series.

To determine different regimes, the computing system identifies changes and/or relationships between the received time series. For example, consider two time series data T1 and T2 where the computing system wants to predict T2. Assume that values of T1 are (1, 1, 1, 2, 2, 2) and the corresponding values of T2 are (2, 2, 2, 4, 4, 4). If the computing system monitors at each of the time series data in isolation there is a change at time step 4. However, if the computing system fits a linear model to these two time series data T1 and T2, the relationship between the two time series data has remained unchanged, i.e., the stationary relationship is T2=2×T1. In other words, although the time series data have changed in isolation, from a prediction point of view, there is no change in their relationship. Thus, upon receiving further values of T1, the computing system can predict further values of T2, and vice versa, based on this relationship. The computing system determines that there is a single regime (i.e., a single relationship, T2=2×T1) between these two time series data T1 and T2. On the other hand, if T2 was (2, 2, 2, 10, 10, 10), the computing system splits the data into two regimes, i.e., T2=2×T1 and T2=5×T1.

FIGS. 1-2 illustrate a methodology to effectively perform time series data prediction in multi-step ahead in complex dynamically changing domains. Aspects of this methodology include, but are not limited to: (1) a way of identifying regimes in two or more input time series data; and (2) a classification scheme to improve a range of the predictions.

FIG. 1 is a flow chart that describes method steps for identifying different regimes and for determining dataset used to run a supervised learning algorithm in one embodiment. At step 100, the computing system starts to operate. At step 105, the computing system receives, from at least one sensor (e.g., a sensor 1315 in FIG. 13) in a manufacturing or production environment (e.g., a manufacturing or production environment 1310 in FIG. 13) via a network (e.g., a network 1305), two or more time series data having values that represent current conditions of the manufacturing environment or production environment. The network includes, but is not limited to: Internet, Intranet, wireless network, wired network, etc. The time series data include, but are not limited to: temperature measurements, pressure measurements, gas flow offset values, temperature offset values, a deposition rate in a semiconductor CMP (Chemical Mechanical Planarization) process, etc. The computing system also receives, from a user, a minimum cluster size (MCS) and an error threshold (ET). MCS refers to the minimum number of time series data per a regime. ET is used as a threshold to determine whether the computing system is to run a supervised learning algorithm on a relatively smaller dataset (e.g., 500 time series) or a relatively large dataset (e.g., 1000 time series). At step 110, the computing system determines different regimes in the received two or more time series. To determine the different regimes, the computing system compares the received two or more time series. The computing system identifies at least one relationship between the received two or more time series data based on the comparison. Each identified different relationship represents each different regime. Each different linear regressor (i.e., each different linear equation) may represent each different relationship. The computing system fits each different linear regressor to each different regime and calculates each error upon fitting each different linear regressor to each different regime.

Figure 3:
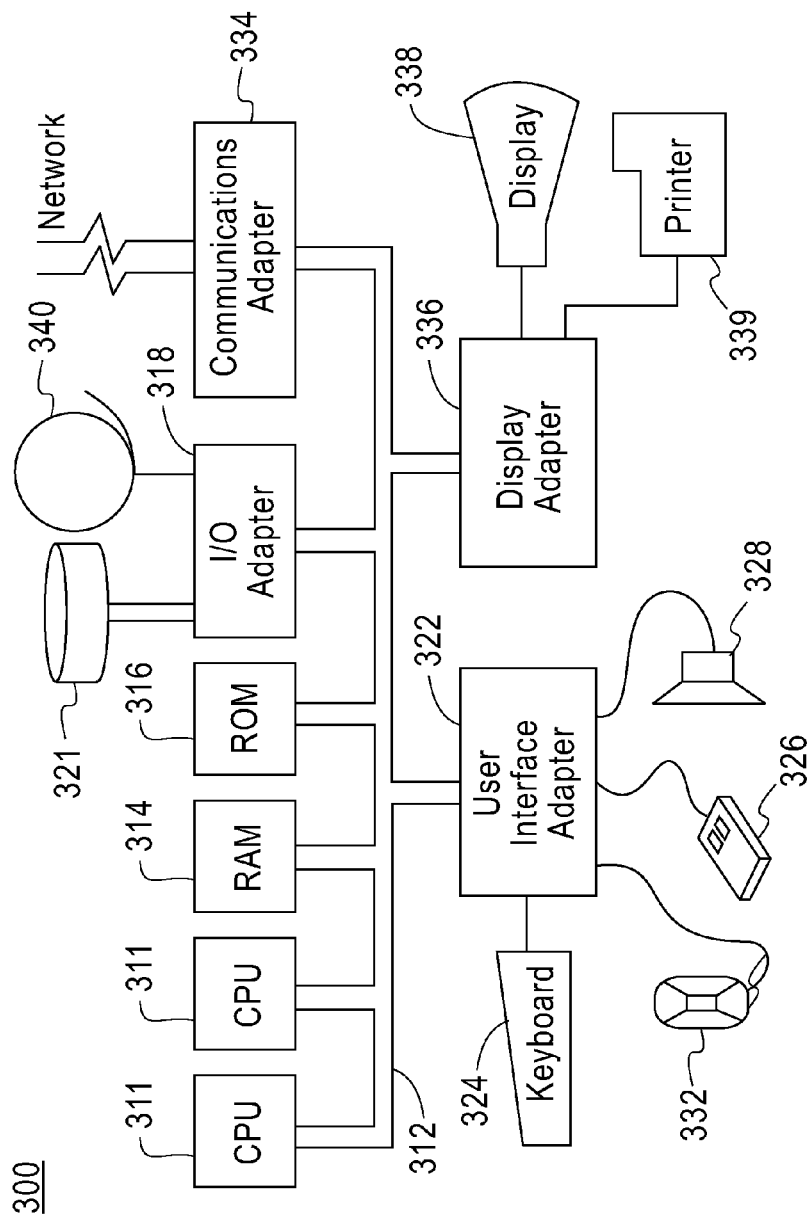
FIG. 3 illustrates an exemplary hardware configuration of a computing system to run the method steps described in FIGS. 1-2 in one embodiment.
Figure 5:
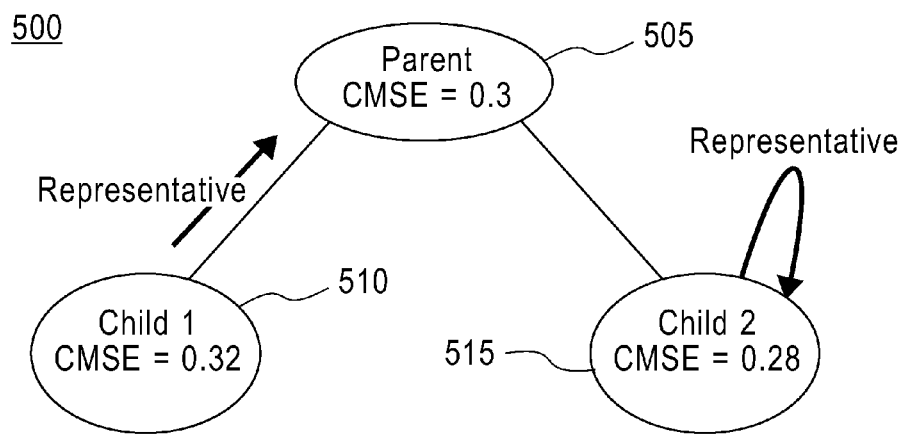
FIG. 5 illustrates exemplary child CMSE (Cumulative Mean Square Error) and parent CMSE to determine datasets to run a supervised learning algorithm in one embodiment.

At step 115, the computing system sums up the calculated error(s) and stores the summation of the error(s) in a memory device (e.g., a RAM 314 in FIG. 3) or storage device (e.g., a disk 321 in FIG. 3). At step 120, the computing system divides equally the received two or more time series data. At step 125, the computing system evaluates whether the size of the divided time series data is less than the minimum cluster size. If the size of the divided time series data is larger than or equal to the minimum cluster size, at step 130, for each divided time series data, the computing system repeats steps 110-130. In one embodiment, these divisions may create a binary tree data structure as a parent dataset (e.g., undivided time series data) is divided equally into two child datasets (e.g., divided time series data). FIG. 5 illustrates an exemplary binary tree data structure, where an exemplary parent dataset 505 is divided equally into two child datasets, a first child dataset 510 and a second child dataset 515. If the divided time series data is less than the minimum cluster size, at step 135, the computing counts the total number of child datasets (i.e., the number of time series data at leaf nodes) at the bottom of the binary tree data structure and sets the total number of the bottom child datasets as "k."

Returning to FIG. 1, at step 140, the computing sets an iteration variable "Child_count" as zero. At step 145, the computing system increments the iteration variable every time the computing system runs a supervised learning algorithm on a child dataset (i.e., a leaf node) at the bottom of the binary tree data structure. The computing system repeats steps 145-180 until the computing system runs the supervised learning algorithm on all the child datasets (i.e., all the leaf nodes) at the bottom of the binary tree data structure. A supervised learning algorithm (e.g., decision tree, neural network, etc.) is a machine learning algorithm that infers a regression function from training data. In one embodiment, the training data comprises an input time series data and a potential output time series. In this embodiment, by analyzing the input time series, the supervised learning algorithm produces the regression function (i.e., non-linear equation or linear equation different from the linear regressors used for identifying regimes) that predicts accurate values of the output time series data based on the input time series. Kotsiantis, et al., "Supervised Machine Learning: A Review of Classification Techniques," Informatica 31, pp. 249-268, 2007, wholly incorporated by reference, describes the supervised learning algorithm in detail.

Specifically, at step 150, the computing system evaluates whether the computing system has run the supervised learning algorithm on all the child datasets at the bottom of the binary tree data structure. If so, at step 155, the computing system ends the operation. Otherwise, at step 160, the computing system evaluates whether the stored error of a current child dataset is less than "the stored error of a parent dataset—the error threshold (ET)", i.e., child's error<parent's error—ET. For example, in FIG. 5, the stored error in a parent dataset 505 is, for example, 0.3. The stored error of the first child dataset 510 is, for example, 0.32. The stored error of the second child dataset 515 is, for example, 0.28. The error threshold (ET) is, for example, 0.01. Then, the stored error of the first child dataset is larger than "the stored error of the parent dataset—ET". On the other hand, the stored error of the second child dataset is less than "the stored error of the parent dataset—ET".

Returning to FIG. 1, if the stored error of the current child dataset is less than "the stored error of the parent dataset—ET", then at step 165, the computing system runs the supervised learning algorithm on the current child dataset. Then, the supervised learning algorithm may generate a regression function (i.e., a non-linear or linear equation different from the linear regressor used for identifying regimes) that predicts future or unmeasured values of the current child dataset. For example, if a regression function is Y=10x, then upon receiving values of time series data X, the computing system estimates values of time series data Y, i.e., 10 times of X values. The future or unmeasured values may represent future conditions (e.g., possible yield rates of semiconductor wafers) of the manufacturing or product environment.

If the stored error of the current child dataset is larger than or equal to "the stored error of the parent dataset—ET", at step 175, the computing system evaluates whether the parent dataset of the current child dataset is a root node of the binary tree data structure. If so, at step 170, the computing system runs the supervised learning algorithm on the parent dataset of the current child dataset. The supervised learning algorithm produces a regression function that predicts future values of the received two or more time series. Otherwise, if the current child data set is not the root node, at step 180, the computing system sets the parent dataset as the current child dataset and repeats steps 160-180.

FIG. 2 is a flow chart that describes method steps for computing scaling factors in one embodiment. The computing system improves quality of the prediction performed at steps 165-170 in FIG. 1, e.g., by running a classification algorithm on the received two or more time series data to identify scaling factors. The computing system scales the prediction by the identified scaling factors, e.g., by multiplying the regression function (i.e., regression function obtained by running the supervised learning algorithm at steps 165-170 in FIG. 1) by the identified scaling factors.

Specifically, at step 200, the computing system starts to operate. At step 205, the computing system reads the received two or more time series data and the regression function obtained at steps 165-170 in FIG. 1. The computing system receives, from a user, a value of a variable "l" (lower class limit) and a value of a variable "u" (upper class limit). At step 210, the computing system lets each length of the received two or more time series data be "N." The computing system denotes the ith input time series data as $X_i$ and denotes the ith target value of $X_i$ as $Z_i$.

At step 215, the computing system runs a classification algorithm (e.g., known k-mean clustering algorithm, ISO-DATA clustering algorithm, decision tree algorithm, neural network, etc.) on the received two or more time series data with/and u and outputs a classification function C( ), i.e., a mathematical function classifies these time series. At step 220, the computing system sets variables for calculating scaling factors, e.g., S1=0, S2=0, S3=0, w1=0, w2=0, and w3=0. These scaling factors are used to scale output of the regression function. S1 represents a scaling factor for the lower end of the spectrum, i.e., $X_i$ and $Z_i$ belong to a left side 615 of the true values 610 in FIG. 6. w1 represents a weight applied to S1. S2 represents a scaling factor for the middle of the spectrum, i.e., $X_i$ and $Z_i$ belong to a middle 620 of the true values 610 in FIG. 6. w2 represents a weight applied to S2. S3 represents a scaling factor for the higher end of the spectrum, i.e., $X_i$ and $Z_i$ belong to a right side 625 of the true values 610 in FIG. 6. w3 represents a weight applied to S3. At step 225, the computing system sets an iteration variable i to zero. In one embodiment, the lower end of the spectrum indicates values of the two or more time series data that lie below l. The middle of the spectrum indicates values of the two or more time series data that lie between l and u. The higher end of the spectrum indicates values of the two or more time series that lie above u.

The computing system repeats steps 230-270 until all data points in the received two or more time series data are classified. At step 230, the computing system increments the iteration variable. At step 235, the computing system evaluates whether the incremented iteration variable is larger than an upper bound "N." If so, at step 240, the computing system outputs S1/w1, S2/w2 and S3/w3. At step 245, the computing system ends the operation. Otherwise, i.e., if the incremented iteration variable is not larger than "N", at step 250, the computing system evaluates whether $C(X_i)$ is equal to one. If so, at step 255, the computing system outputs $S1+Z_i/R(X_i)$ as S1, where R( ) is the regression function obtained at steps 165-170 in FIG. 1 and also outputs w1+1 as w1. The computing system multiplies $Z_i$ by the outputted S1. Otherwise, i.e., if $C(X_i)$ is not equal to one, at step 260, the computing system evaluates whether $C(X_i)$ is equal to two. If so, at step 265, the computing system outputs $S2+Z_i/R(X_i)$ as S2 and also outputs w2+1 as w2. The computing system multiplies $Z_i$ by the outputted S2. Otherwise, i.e., if $C(X_i)$ is not equal to one or two, at step 270, the computing system outputs $S3+Z_i/R(X_i)$ as S3 and also outputs w3+1 as w3. The computing system multiplies $Z_i$ by the outputted S3.

Figure 7:
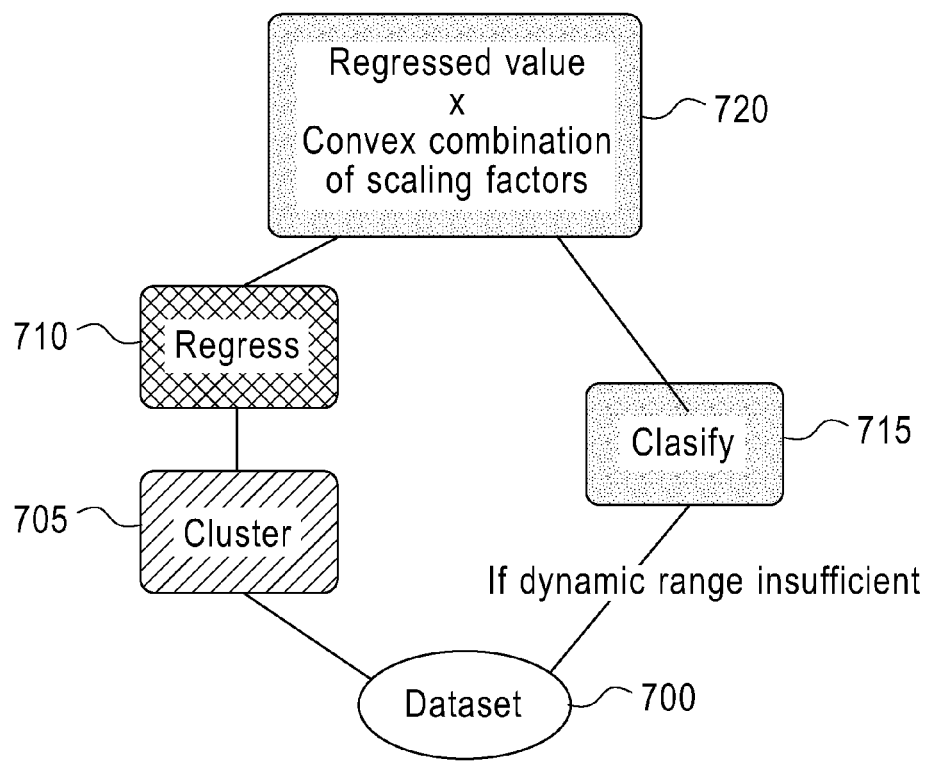
FIG. 7 illustrates an overview diagram of the method steps described in FIGS. 1-2 in one embodiment.

FIG. 7 summarizes method steps described in FIGS. 1-2 in one embodiment. Upon receiving two or more time series data 700, the computing system identifies different regimes in the received two or more time series data 700 and runs a supervised learning algorithm 705 on each different regime, e.g., by running method steps in FIG. 1. Then, the supervised learning algorithm 705 produces a regression function that predicts future values of the received two or more time series. If predicted future values are not sufficient to reflect a true dataset, the computing system classifies 715 the received two or more time series data to identify different scaling factors to be multiplied to each data point in the time series, e.g., by running method steps in FIG. 2. Then, the computing system runs the regression function 720, which are scaled up by the multiplication, with the time series data, to more accurately predict the future values of the received two or more time series.

FIG. 11 illustrates a pseudo code implementation ("Algorithm 1") corresponding to the flow chart depicted in FIG. 1 in one embodiment. In Algorithm 1, code block 1100 corresponds to method steps 125-130 in FIG. 1. Code block 1105 corresponds to method steps 110-115 in FIG. 1. Code block 1110 corresponds to method steps 120 in FIG. 1. Code block 1112 corresponds to method steps 140-15 in FIG. 1. Code block 1115 describes a situation where only one regime is identified. Code block 1120 corresponds to method steps 160, 175 and 180 in FIG. 1. Code block 1125 corresponds to method steps 165-170 in FIG. 1. In Algorithm 1, different regimes are identified based on changes in relationships between pairs of input time series. The algorithm 1 takes, as inputs, a minimum cluster size ($\delta$), which specifies a lower bound on the amount of time series data in each regime and $\epsilon$ which is an error threshold. Algorithm 1 considers the entire dataset (i.e., input time series data), fits a linear regressor(s) between all pairs of input time series, and computes the cumulative mean squared error (CMSE) upon the fitting. CMSE is the sum of individual mean squared errors for every pair of linear regressors. Mean squared error is the sum of squares of the difference between true values and predicted values, divided by the total number of such values. Then, the dataset (i.e., input time series data) is split into two equal parts, and linear regressors are fit in each part for all pairs of inputs with each reporting its corresponding CMSE. This process continues until a further split of a particular part leads to a part that is smaller than $\delta$. Hence, there is provided a binary tree data structure where every node in this tree is associated with a CMSE value and a set of coefficients for the $(d-1)(d-2)/2$ linear regressor, where "d" refers to the number of input time series.

When a particular part of input time series data is split into two child parts, there always exists a child part with mean squared error (MSE) for any pair of time series data less than or equal to the parent part. In other words, consider two real vectors $T_1$ and $T_2$ of length "N," given by $t_1^{(1)}, t_1^{(2)}, \ldots, t_1^{(N)}$ and $t_2^{(1)}, t_2^{(2)}, \ldots, t_2^{(N)}$ respectively. Let m equalize sequential partitions of these vectors denoted by $P_1, P_2, \ldots, P_m$. Each $P_i (1 \leq i \leq m)$ corresponds to a segment of "m" consecutive observations from the two time series data given by $\{(t_1^{((i-1)m+1)}, t_1^{((i-1)m+2)}, \ldots, t_1^{((i)m)}), (t_2^{((i-1)m+1)}, t_2^{((i-1)m+2)}, \ldots, t_2^{((i)m)})\}$. With $T_1$ as the input time series data and $T_2$ as the output, the computing system may identify "m+1" linear relationships between $T_1$ and $T_2$, one for each of the "m" partitions $P_i$. Denote the entire time series data by $R_1$, $R_2, \ldots, R_m$ and $R_T$ respectively. Then, there always exists a partition $P_i$ with the corresponding model $R_i$ whose mean squared error is less than or equal to the mean squared error of $R_T$.

Algorithm 1 uses the error threshold, $\epsilon$, to decide whether to use the child part as a regime or the parent part. As shown in FIG. 5, if a reduction in the stored error from the parent dataset 505 to the child dataset (e.g., child dataset 515) is greater than or equal to the error threshold, the computing system uses the child dataset (e.g., child dataset 515) to represent a regime, else the computing system use the parent dataset. In Algorithm 1, this threshold is given by $\epsilon$. After the computing system identifies these different regimes/states, the computing system runs the supervised learning algorithm for each of these regimes. When testing, a test point is assigned to a regime whose coefficients when applied to the test inputs lead to the lowest CMSE. Hence, Algorithm 1 to identify different states is based on the assumption that since, various time series data are generated from a same physical system, the time at which relationships change between any pair of them may correspond to changes in relationships between them and the target time series.

Figure 6:
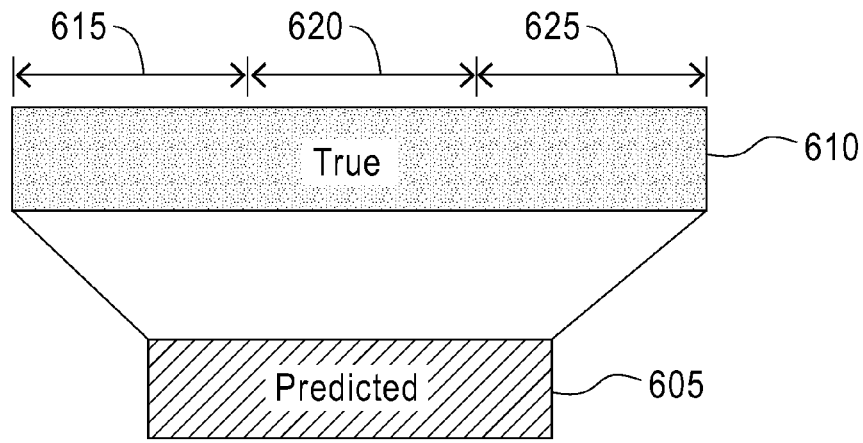
FIG. 6 illustrates scaling predicted values in accordance with true values in one embodiment.

The flow chart in FIG. 1 and/or Algorithm 1 in FIG. 11 describes a method to identify different regimes that are coherent from a prediction standpoint. However, in one embodiment, as shown in FIG. 6, these regimes (e.g., predicted values 605) may not be sufficient to capture a dynamic range of true values (e.g., true values 610), e.g., because target values in time series data may be drifting with a certain bias. For example, until the current time period, the computing system monitors few target values above "k" in a time series. This count can drastically change as the computing system attempts to predict multiple steps ahead, i.e., multiple future values in that time series. Since, the flow chart depicted in FIG. 1 and Algorithm 1 in FIG. 11 attempt to minimize a cumulative error when fitting, a mediocre prediction on observations with true values above "k" does not increase the cumulative error by the current time period. However, as the proportion of such observations (i.e., true values above "k") increases in the future, the impact on the cumulative error may increase.

In particular, FIG. 6 illustrates the predicted values 600 (i.e., output values generated from a regression function obtained in method steps 165-170 in FIG. 1) does not sufficiently reflect the true dataset 610. In such an example, (e.g., a situation 600 in FIG. 6, where the predicted values 600 are insufficient to reflect the true values 610), the computing system scales up the prediction 605 from the regression function obtained at steps 165-170 in FIG. 1 in an appropriate direction depending on if the identified different regimes 600 are at the lower end of the spectrum (e.g., left side 615 of the true values 610), in the middle of the spectrum (e.g., middle 620 of the true value 610) or at the higher end of the spectrum (e.g., right side 625 of the true value 610).

FIG. 12 illustrates an exemplary pseudo code implementation ("Algorithm 2") that corresponds to the flow chart depicted in FIG. 2 in one embodiment. Algorithm 2 decides what scaling factor to use for the lower end of the spectrum (e.g., a left side 615 of the true value 610 in FIG. 6) and analogously the higher end of the spectrum (e.g., a right side 625 of the true value 610 in FIG. 6), e.g., from domain knowledge or by standard model selection techniques, e.g., cross-validation. The Algorithm 2 outputs scaling factors, e.g., S1, S2 and S3, for each class i.e. the amount by which a regression function may be scaled depending on the class in which the input time series data lies. When testing, the regression function is multiplied by a convex combination of scaling factors, if the probability of being in that class is high (, e.g., >0.5) for that input time series, where the weights in the convex combination are probabilities of a particular input time series data belonging to each of the classes. In one embodiment, the computing systems runs method steps in the FIG. 1 and method steps in FIG. 2 over different parts of the received two or more time series. In one embodiment, the supervised learning algorithm in FIG. 1 is different from the classification algorithm in FIG. 2. For example, if the supervised learning algorithm in FIG. 1 used a neural network, the classification algorithm in FIG. 2 uses a decision tree.

In Algorithms 1 and 2 illustrated in FIGS. 11-12, if "N" is the length of the input time series, $\delta$ is the minimum cluster size, d is the number of time series, and O(R) is the time complexity (i.e., running time) of a supervised learning algorithm used in each regime, then the time complexity of Algorithm 1 is $$O\left(\left(\frac{N}{\delta}d\right)^2 + R\right).$$

If the O(C) is the time complexity of the classification algorithm used in Algorithm 2, then the time complexity of Algorithm 1 and algorithm 2 used together is $$O\left(\left(\frac{N}{\delta}d\right)^2 + R + C\right).$$

Usually, a user needs enough data in each regime to return a regression function and hence, $$\frac{N}{\delta} \ll N.$$

FIG. 3 illustrates an exemplary hardware configuration of the computing system 300 that run method steps described in FIGS. 1-2 in one embodiment. The hardware configuration preferably has at least one processor or central processing unit (CPU) 311. The CPUs 311 are interconnected via a system bus 312 to a random access memory (RAM) 314, read-only memory (ROM) 316, input/output (I/O) adapter 318 (for connecting peripheral devices such as disk units 321 and tape drives 340 to the bus 312), user interface adapter 322 (for connecting a keyboard 324, mouse 326, speaker 328, microphone 332, and/or other user interface device to the bus 312), a communication adapter 334 for connecting the system 300 to a data processing network, the Internet, an Intranet, a local area network (LAN), etc., and a display adapter 336 for connecting the bus 312 to a display device 338 and/or printer 339 (e.g., a digital printer of the like).

Comparisons of the methodology described in FIGS. 1-2 with other traditional methods are presented. The computing system performed comparisons on three real industrial datasets, oil production dataset, semiconductor etching dataset, and wafer speed prediction dataset. On each of the datasets, the computing system performed a sequential 90%/10% train/test split (i.e., 90% of each dataset is used for running of algorithms 1 and 2 and remaining 10% of each dataset is used for testing) and compared the methodology described in FIGS. 1-2 with traditional methods. The computing system reported the performance in terms of $R^2$ as a function of the number of steps ahead the computing system predicts. $R^2$ is a standard evaluation criteria in statistics, which measures how good a given model is compared to a baseline model that is the mean of target variable on a training dataset. Formally, $R^2=1-MSE(M)/MSE(\mu)$, where MSE(M) is the mean squared error of a model M and MSE($\mu$) is the mean squared error of the mean of a target variable on the training dataset. Hence, a $R^2$ close to 1 and away (in the positive direction) from zero indicates that the model is performing much better than the baseline. While a negative $R^2$ indicates that the model is doing worse than the baseline. In the experiments, the computing system indicated negative $R^2$ as zero.

A. Oil Production Dataset

Figure 8:
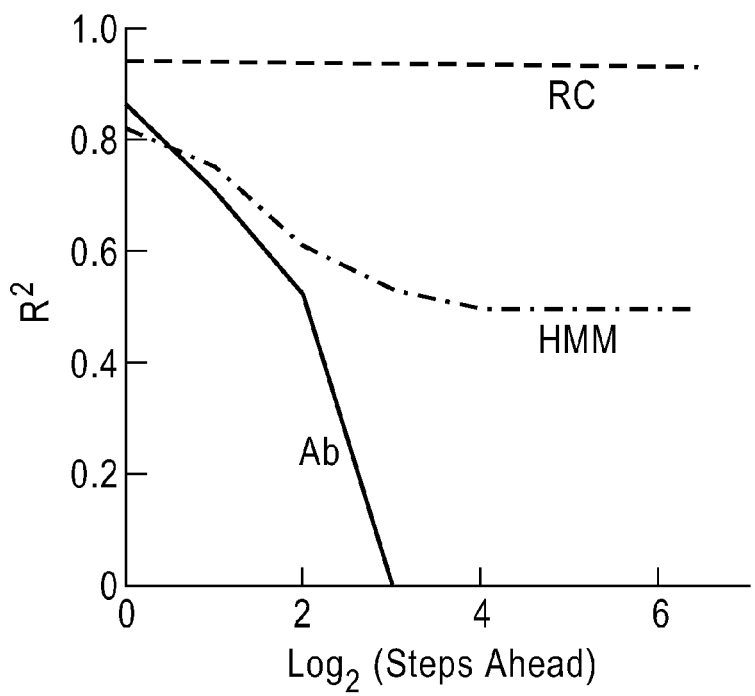
FIG. 8 illustrates experimental results of various methods on oil production dataset in one exemplary embodiment.
Figure 9:
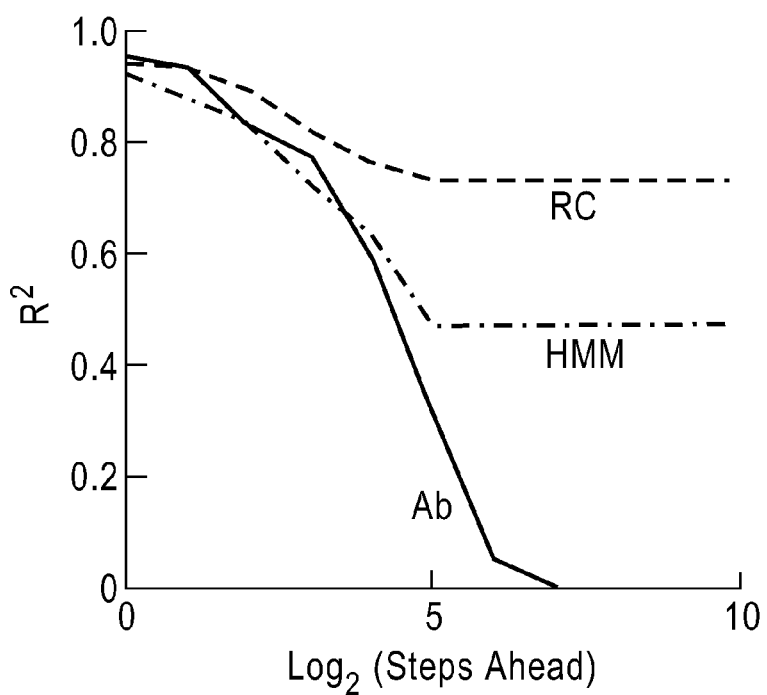
FIG. 9 illustrates experimental results of various methods on semiconductor manufacturing dataset in one exemplary embodiment.
Figure 10:
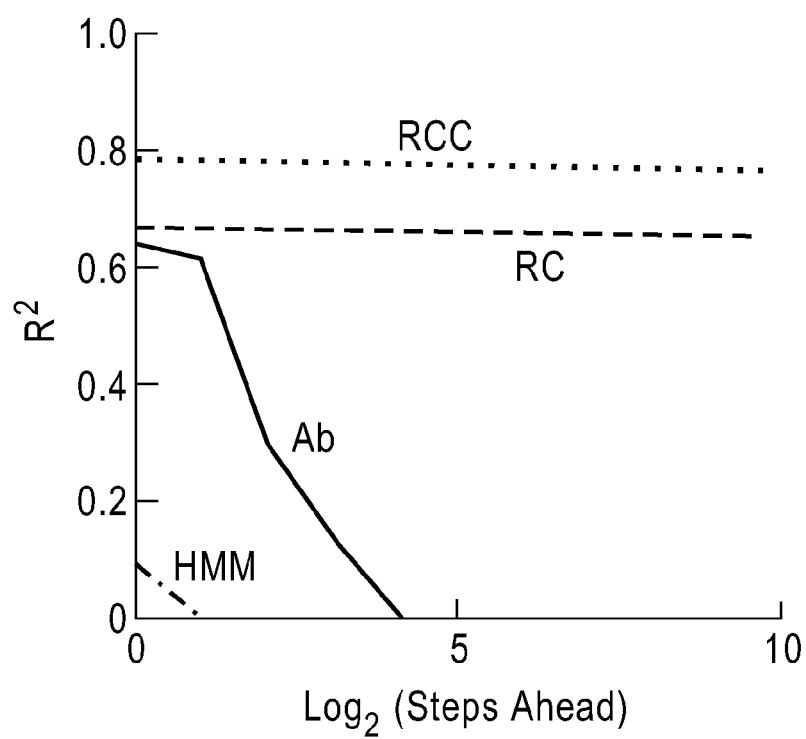
FIG. 10 illustrates another experimental result of various methods on semiconductor manufacturing dataset in one exemplary embodiment.

Oil companies periodically launch production a logging process to obtain an idea of the overall performance as well as to assess individual performances of particular oil wells and reservoirs. This logging process is usually expensive and laden with danger for the people involved in the process. Automated monitoring of oil production equipment is an efficient, risk free and economical alternative to the logging process. The dataset the computing system performed experiments on, was obtained from a major oil corporation. There are a total of nine measures in the dataset. These measures are obtained from the sensors of a 3-stage separator which separates oil, water and gas. The nine measures are composed of 2 measured levels of the oil water interface at each of the 3 stages and 3 overall measures. Target measure is Daily production. The dataset size is 992. $\delta$ is set to 200 and $\epsilon$ is set to 0.1 in algorithm 1. The computing system uses a 2-layer radial basis neural network in each of the states. Since algorithm 1 provides sufficient dynamic range on the training set the computing system did not use the classification part, i.e., algorithm 2, in order to expand it. In FIGS. 8-10, RC denotes methodology described in FIGS. 1-2, Ab denotes a traditional auto-correlation method, and HMM denotes a traditional hidden Markov model. From FIG. 8, the computing system performs the methodology described in FIGS. 1-2 better than the other methods for all step sizes. RC and HMM shows a positive $R^2$ while the auto-correlation methods do not. Since the RC and HMM method use also 2025 time series data other than the target time series data to make their predictions, which is not the case with the auto-correlation models.

B. Semiconductor Etching Dataset

In a semiconductor device fabrication process, etching is a key step where a wafer is etched out in order to deposit other material at a further downstream step. To etch out a wafer, a certain compound is deposited. It is crucial that this compound is deposited in a sufficient quantity. Hence, a key parameter in this process is a deposition rate of that compound, which is expensive to measure as it requires sophisticated monitoring equipment. The example dataset that the computing system had have 2026 features, where the deposition rate is one of them. The other features are a combination of physical measurements (temperature, pressure etc.) and equipment settings (gas flow offset, temperature flow offset etc.). The dataset size is 9000. δ is set to 2000, and ε is set to 0.1 in algorithm 1. The computing system uses a ridge regression in each regime. Hoerl, et al., "Ridge Regression: Applications to Nonorthogonal Problems," Technometrics, vol. 12, no. 1, February, 1970, pp. 69-82, wholly incorporated by reference, describes ridge regression in detail. Since, the algorithm 1 gives the computing system sufficient dynamic range on the training set, the computing system does not use the classification part, i.e., algorithm 2 in order to expand it. FIG. 9 shows that methodology described in FIGS. 1-2 performs better than the other methods for step sizes beyond 1. For step size 1, the performance of the methodology described in FIGS. 1-2 is more or less comparable with the auto-correlation methods but slightly worse. RC and HMM shows a positive $R^2$ while the autocorrelation methods do not since, the prior methods use also the 2025 time series data other than the target time series data to make their predictions, which is not the case with the auto-correlation models.

C. Wafer Speed Prediction Dataset

In a semiconductor chip manufacturing industry, predicting speeds of processor devices in wafers accurately ahead of time can be crucial in choosing an appropriate set of wafers to send forward for further processing. Eliminating faulty wafers can save the industry resources in terms of time and money. The dataset the computing system received has 175 features, where the wafer speed is one of them. Other features are a combination of physical measurements and electrical measurements made on the wafer. The dataset size is 2361. δ is set to 1000, and c is set to 0.1 in algorithm 1. The computing system uses a ridge regression in each regime. In this case, algorithm 1 does not provide a sufficient dynamic range on the training set, so the computing system uses the classification part, i.e., algorithm 2 in order to expand it. The class ranges are deciphered using 10-fold cross-validation in this case, which are inputs to algorithm 2. Here again both methods ("RC" and "RCC") are better than the other methods with RCC being the best, where RCC refers to methodology described in FIGS. 1-2 and stands for regression+clustering+classification. The classification part (i.e., flowchart in FIG. 2) provides the necessary boost to the regression part (i.e., flowchart in FIG. 1) yielding better predictions.

In a further embodiment, the methodology described in FIGS. 1-2 can be extended. One extension may be to combine various regimes based on a closeness of their pair-wise regression coefficients. If the coefficients for every pair of input time series data in a particular regime are represented as a single data point, then the closeness refers to the distance between this data point and another data point representing that a different regime lies below a threshold. Another extension may be to update these coefficients for respective regimes during testing, based on the error of assigned test points. These extension may help in better capturing drifts that may occur in the input time series. Another extension may be to frame methodology described in FIGS. 1-2 as a relational learning problem. This relational learning problem considers observations up to "k" steps behind as relational neighbors and use statistical relational learning to perform a collective inference.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with a system, apparatus, or device running an instruction.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with a system, apparatus, or device running an instruction.

Program code embodied on a computer readable medium may be transmitted using any appropriate medium, including but not limited to wireless, wireline, optical fiber cable, RF, etc. or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may run entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which run via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which run on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more operable instructions for implementing the specified logical function(s). It should also be noted that, in some alternative implementations, the functions noted in the block may occur out of the order noted in the figures. For example, two blocks shown in succession may, in fact, be run substantially concurrently, or the blocks may sometimes be run in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for improving a manufacturing or production environment, the method comprising:
   receiving two or more time series data having values that represent current conditions of the manufacturing or production environment as inputs;
   determining one or more different regimes in the received two or more time series data, the determining including:
      comparing values of the received two or more time series data; and
      identifying at least one relationship between the received two or more time series data, each identified different relationship representing a different regime;
   computing a different linear regressor for representing the each identified different relationship;
   calculating an error upon fitting each different linear regressor to the each identified different regime;
   summing up the calculated error; and
   predicting, based on summed error, future or unmeasured values of the received two or more time series data in the each identified different regimes, the future or unmeasured values representing future conditions of the manufacturing or production environment, the predicting including:
      determining datasets among the received two or more time series data according to the summed error; and
      running a supervised learning algorithm on the determined datasets corresponding to the each identified different regime,
   wherein a processor connected to a memory device is configured to perform: the receiving, the determining the regimes, the comparing, the identifying, the computing, the calculating, the summing, the predicting, the determining the datasets and the running.

2. A method for improving a manufacturing or production environment, the method comprising:
   receiving two or more time series data having values that represent current conditions of the manufacturing or production environment as inputs;
   determining one or more different regimes in the received two or more time series data; and
   predicting future or unmeasured values of the received two or more time series data in the determined different regimes;
   running a classification algorithm on the received two or more time series data to identify scaling factors; and
   scaling the predicted values by the identified scaling factors, whereby a quality of the predicting improves,
   wherein the scaled values represent future conditions of the manufacturing or production environment,
   wherein a processor coupled to a memory device performs the receiving, the determining, the predicting, the running, and the scaling.

3. The method according to claim 2, wherein the determining the different regimes includes:
   comparing values of the received two or more time series data; and
   identifying at least one relationship between the received two or more time series data,
   wherein each different relationship identified represents a different regime.

4. The method according to claim 3, further comprising:
   computing a different linear regressor for representing each different relationship.

5. The method according to claim 4, further comprising:
   dividing equally the received two or more time series data until the divided time series data is less than a predetermined minimum size.

6. The method according to claim 4, further comprising:
   calculating an error upon fitting each different linear regressor to each different regime; and
   summing up the calculated error.

7. The method according to claim 2, wherein the manufacturing or production environment includes a semiconductor manufacturing environment or oil production environment.

8. The method according to claim 7, wherein the received two or more time series data represent physical measurements including one or more of: temperature measurements, pressure measurements, gas flow offset values, and temperature flow offset values, in the manufacturing or production environment.

9. The method according to claim 2, wherein a time complexity to perform the receiving, the determining and the predicting is calculated as a function of a total length of the received two or more time series, a number of time series data in a regime which includes a minimum number of time series data among the one or more different regimes, a number of the received two or more time series, and a time complexity of a supervised learning algorithm used in each regime.

10. A system for improving a manufacturing or production environment, the system comprising:
at least one processor; and
at least one memory device connected to the processor, wherein the processor is configured to:
receive two or more time series data having values that represent current conditions of the manufacturing or production environment as inputs;
determine one or more different regimes in the received two or more time series data, the determine including:
compare values of the received two or more time series data; and
identify at least one relationship between the received two or more time series data, each identified different relationship representing a different regime,
compute a different linear regressor for representing the each identified different relationship;
calculate an error upon fitting each different linear regressor to each identified different regime;
sum up the calculated error;
predict future or unmeasured values of the received two or more time series data in the each identified different regime, the predict including:
determine datasets among the received two or more time series data according to the summed error; and
run a supervised learning algorithm on the determined datasets corresponding to the each identified different regime,
wherein the future or unmeasured values represents future conditions of the manufacturing or production environment.

11. A system for improving a manufacturing or production environment, the system comprising:
at least one processor; and
at least one memory device connected to the processor, wherein the processor is configured to:
receive two or more time series data having values that represent current conditions of the manufacturing or production environment as inputs;
determine one or more different regimes in the received two or more time series data;
predict future or unmeasured values of the received two or more time series data in the determined different regimes;
run a classification algorithm on the received two or more time series data to identify scaling factors; and
scale the predicted values by the identified scaling factors,
wherein the scaled values represent future conditions of the manufacturing or production environment, whereby a quality of the predicting improves.

12. The system according to claim 11, wherein to determine the different regimes, the processor is configured to:
compare values of the received two or more time series data; and
identify at least one relationship between the received two or more time series data,
wherein each different relationship identified represents a different regime.

13. The system according to claim 12, wherein a different linear regressor represents each different relationship.

14. The system according to claim 13, wherein the processor is further configured to:
divide equally the received two or more time series data until the divided time series data is less than a predetermined minimum size.

15. The system according to claim 13, wherein the processor is further configured to:
calculate an error upon fitting each different linear regressor to each different regime; and
sum up the calculated error.

16. The system according to claim 11, wherein the manufacturing or production environment includes a semiconductor manufacturing environment or oil production environment.

17. The system according to claim 16, wherein the received two or more time series data represent physical measurements including one or more of: temperature measurements, pressure measurements, gas flow offset values, and temperature flow offset values, in the manufacturing or production environment.

18. The system according to claim 11, wherein a time complexity to perform the receive, the determine and the predict is calculated as a function of a total length of the received two or more time series, a number of time series data in a regime which includes a minimum number of time series data among the one or more different regimes, a number of the received two or more time series, and a time complexity of a supervised learning algorithm used in each regime.

19. A computer program product for improving a manufacturing or production environment, the computer program product comprising a non-transitory storage medium readable by a processing circuit and storing instructions run by the processing circuit for performing a method, the method comprising:
receiving two or more time series data having values that represent current conditions of the manufacturing or production environment as inputs;
determining one or more different regimes in the received two or more time series data; and
predicting future or unmeasured values of the received two or more time series data in the determined different regimes,
running a classification algorithm on the received two or more time series data to identify scaling factors; and
scaling the predicted values by the identified scaling factors,
wherein the scaled predicted values represent future conditions of the manufacturing or production environment, whereby a quality of the predicting improves.

20. The computer program product according to claim 19, wherein the determining the different regimes includes:
comparing values of the received two or more time series data; and
identifying at least one relationship between the received two or more time series data,
wherein each different relationship identified represents a different regime.

* * * * *